United States Patent
Sussman 4,231,637
Nov. 4, 1980

[54] SEVEN-COMPONENT MICROSCOPE OBJECTIVE

[75] Inventor: Milton H. Sussman, Amherst, N.Y.

[73] Assignee: American Optical Corporation, Southbridge, Mass.

[21] Appl. No.: 23,052

[22] Filed: Mar. 22, 1979

[51] Int. Cl.³ .................... G02B 9/64; G02B 21/02
[52] U.S. Cl. ..................... 350/175 ML; 350/214
[58] Field of Search ............... 350/175 ML, 177, 214

[56] References Cited

U.S. PATENT DOCUMENTS 3,806,231   4/1974   Taira .................. 350/175 ML X

*Primary Examiner*—Paul A. Sacher
*Attorney, Agent, or Firm*—Jeremiah J. Duggan; Alan H. Spencer

[57] ABSTRACT

A seven-member microscope objective having a numerical aperture of 0.55 providing a magnification of substantially 40X in combination with a telescope objective as described in U.S. Pat. No. 3,355,234 is disclosed.

1 Claim, 1 Drawing Figure

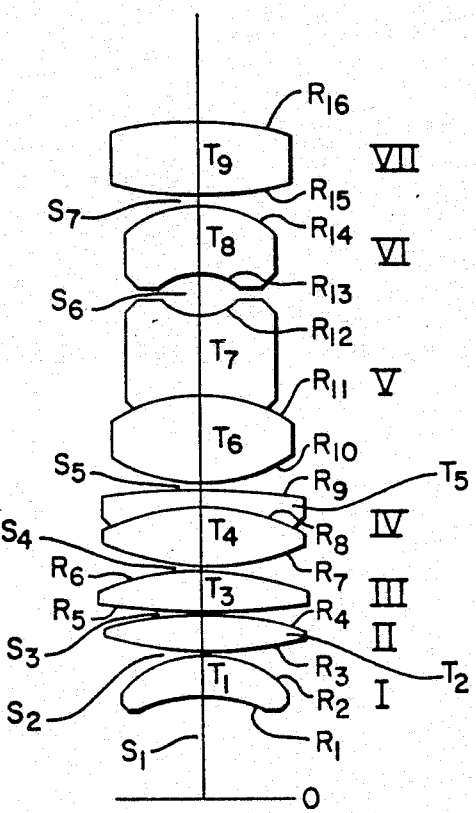

SEVEN-COMPONENT MICROSCOPE OBJECTIVE

BACKGROUND OF THE INVENTION

The present invention relates to microscope objectives, and more particularly, to an achromatic microscope objective with a numerical aperture of substantially 0.55 having seven components. It is an object of this invention to provide such a microscope objective which is well-corrected for the usual chromatic image aberrations as well as spherical aberration, coma and astigmatism, a 40X magnification in combination with a telescope objective as described in U.S. Pat. No. 3,355,234.

The closest known prior art is U.S. Pat. No. 3,806,231 issued Apr. 23, 1974 to Taira. This patent discloses an objective having seven lenses and a large working distance. The principal differences of the objective of the present invention and reference resides in the prior art objective not providing parallel light exiting the last member of the objective as required by the present objective.

THE DRAWING AND THE INVENTION

The drawing is an optical diagram of the objective having lens elements I, II, III, IV, V, VI, and VII in alignment along an optical axis extending from object plane 0. The first element I is a concavo-convex negative singlet; the second element II is a positive biconvex singlet, followed by lens element III which is a biconvex positive singlet, lens element IV, which is a biconvex positive doublet followed by lens element V, which is a convex-concave negative doublet, lens element VI, which is a concavo-convex negative singlet and lens element VII, which is a biconvex positive singlet. The parameters of the objectives are set forth in the Table wherein the axial thicknesses of successive lens elements are designated $T_1$ to $T_9$, and the successive axial spaces from the object plane 0 are designated $S_1$ to $S_7$. Successive lens radii are designated $R_1$ to $R_{16}$ where the minus sign (−) applies to surfaces whose center of curvature lies on the object side of their vertices. The refractive indices and Abbe numbers of the glasses in the successive lenses are absolute values and designated $ND_1$ to $ND_9$ and $\nu_1$ to $\nu_9$, respectively.

What is claimed is:

1. A microscope objective having seven lenses aligned in sequence on an optical axis and that exits parallel light from the last element which comprises the following lens parameters, where radii (R), thicknesses (T) and spacing (S) are in millimeters and numbered sequentially from the object plane, a minus sign (−) denotes a radius having a center of curvature on the object side of the respective lens, and indices of refraction (ND) and Abbe numbers ($\nu$) are absolute values

TABLE

| Lens | Radius (R) | Thickness (T) | Spacing (S) | Refractive Index (ND) | Abbe Number ($\nu$) |
|---|---|---|---|---|---|
|     |                |              | $S_1 = 4.0$ |              |              |
| I   | $R_1 = -8.000$ | $T_1 = 1.80$ |             | $ND_1 = 1.564$ | $\nu_1 = 60.80$ |
|     | $R_2 = -4.515$ |              |             |              |              |
|     |                |              | $S_2 = 0.2$ |              |              |
|     | $R_3 = 22.933$ |              |             |              |              |
| II  |                | $T_2 = 1.20$ |             | $ND_2 = 1.487$ | $\nu_2 = 84.46$ |
|     | $R_4 = -14.370$ |             |             |              |              |
|     |                |              | $S_3 = 0.2$ |              |              |
|     | $R_5 = -34.020$ |             |             |              |              |
| III |                | $T_3 = 1.60$ |             | $ND_3 = 1.434$ | $\nu_3 = 95.60$ |
|     | $R_6 = -10.140$ |             |             |              |              |
|     |                |              | $S_4 = 0.2$ |              |              |
|     | $R_7 = 11.230$ |              |             |              |              |
| IV  |                | $T_4 = 2.20$ |             | $ND_4 = 1.434$ | $\nu_4 = 95.60$ |
|     | $R_8 = -8.671$ |              |             |              |              |
|     |                | $T_5 = 0.70$ |             | $ND_5 = 1.613$ | $\nu_5 = 44.29$ |
|     | $R_9 = -55.748$ |             |             |              |              |
|     |                |              | $S_5 = 0.2$ |              |              |
|     | $R_{10} = 6.290$ |            |             |              |              |
| V   |                | $T_6 = 3.50$ |             | $ND_6 = 1.487$ | $\nu_6 = 84.46$ |
|     | $R_{11} = -8.388$ |           |             |              |              |
|     |                | $T_7 = 3.40$ |             | $ND_7 = 1.673$ | $\nu_7 = 32.20$ |
|     | $R_{12} = 2.639$ |            |             |              |              |
|     |                |              | $S_6 = 1.6$ |              |              |
|     | $R_{13} = -2.593$ |           |             |              |              |
| VI  |                | $T_8 = 2.70$ |             | $ND_8 = 1.54$ | $\nu_8 = 45.75$ |
|     | $R_{14} = -5.075$ |           |             |              |              |
|     |                |              | $S_7 = 0.2$ |              |              |
|     | $R_{15} = 12.300$ |           |             |              |              |
| VII |                | $T_9 = 2.95$ |             | $ND_9 = 1.487$ | $\nu_9 = 84.46$ |
|     | $R_{16} = -20.060$ |          |             |              |              |

* * * * *